United States Patent
Woods

(10) Patent No.: US 6,182,063 B1
(45) Date of Patent: Jan. 30, 2001

(54) METHOD AND APPARATUS FOR CASCADED INDEXING AND RETRIEVAL

(75) Inventor: William A. Woods, Winchester, MA (US)

(73) Assignee: Sun Microsystems, Inc., Palo Alto, CA (US)

(*) Notice: Under 35 U.S.C. 154(b), the term of this patent shall be extended for 0 days.

(21) Appl. No.: 08/829,657

(22) Filed: Mar. 31, 1997

Related U.S. Application Data

(63) Continuation-in-part of application No. 08/499,268, filed on Jul. 7, 1995, now Pat. No. 5,724,571.

(51) Int. Cl.[7] .................................................. G06F 17/30

(52) U.S. Cl. ........................................ 707/3; 707/2; 707/6

(58) Field of Search .......................................... 707/2, 3, 6

(56) References Cited

U.S. PATENT DOCUMENTS

| | | | |
|---|---|---|---|
| 4,839,853 | 6/1989 | Deerwester et al. | 395/605 |
| 4,849,898 | 7/1989 | Adi | 364/419.1 |
| 4,984,178 | 1/1991 | Hemphill et al. | 395/759 |
| 5,062,074 | 10/1991 | Kleinberger | 395/605 |
| 5,276,616 | 1/1994 | Kuga et al. | 364/419.08 |
| 5,301,109 | 4/1994 | Landauer et al. | 364/419.19 |
| 5,321,833 | 6/1994 | Chang et al. | 707/5 |
| 5,325,298 | 6/1994 | Gallant | 364/419.19 |
| 5,404,514 | 4/1995 | Kageneck et al. | 395/605 |
| 5,418,948 | 5/1995 | Turtle | 395/600 |
| 5,418,951 | 5/1995 | Damashek | 395/605 |
| 5,428,778 | 6/1995 | Brookes | 395/605 |
| 5,440,481 | 8/1995 | Kostoff et al. | 364/419.19 |
| 5,450,580 | 9/1995 | Takeda | 395/600 |
| 5,475,588 | 12/1995 | Schabes et al. | 395/2.64 |
| 5,544,352 | 8/1996 | Egger | 395/600 |
| 5,619,709 | * 4/1997 | Caid et al. | 704/9 |
| 5,659,732 | 8/1997 | Kirsch | 707/5 |
| 5,675,819 | 10/1997 | Shuetze | 704/10 |
| 5,706,497 | * 1/1998 | Takahashi et al. | 707/5 |
| 5,724,571 | * 3/1998 | Woods | 707/5 |
| 5,740,425 | 4/1998 | Povlius | 707/100 |
| 5,822,731 | * 10/1998 | Schultz | 704/256 |
| 5,832,182 | 11/1998 | Zhang et al. | 707/101 |
| 5,832,496 | 11/1998 | Anand et al. | 707/102 |
| 5,920,856 | * 7/1999 | Syeda-Mahmood | 707/3 |
| 5,924,090 | * 7/1999 | Krellenstein | 707/5 |
| 5,926,811 | * 7/1999 | Miller et al. | 707/5 |
| 5,963,940 | * 10/1999 | Liddy et al. | 707/5 |
| 5,983,216 | * 11/1999 | Kirsch et al. | 707/2 |
| 5,983,218 | * 11/1999 | Syeda-Mahmood | 707/3 |
| 5,987,460 | * 11/1999 | Niwa et al. | 707/6 |
| 6,101,491 | * 8/2000 | Woods | 707/3 |

OTHER PUBLICATIONS

Salton, G., et al., "Approaches to Passage Retrieval in Full Text Information Systems," Proceedings of the Sixteenth Annual International ACM SIGIR Conference on Research and Development in Information Retrieval (SIGIR 93), ACM Press, 1993, pp. 49–58.

Callan, J.P., "Passage–level Evidence in Document Retrieval," Proceedings of the Seventeenth Annual International ACM–SIGIR Conference on Research and Development in Information Retrieval (SIGIR 94), Springer–Verlag, 1994, pp. 302–310.

(List continued on next page.)

Primary Examiner—Hosain T. Alam
Assistant Examiner—Jean M. Corrielus
(74) Attorney, Agent, or Firm—Finnegan, Henderson, Farabow, Garrett & Dunner, L.L.P.

(57) ABSTRACT

Systems and methods consistent with the present invention respond to queries of stored information by receiving a query identifying desired information; providing the query as a search request to a search engine; receiving a search result from the search engine, including identifiers for stored documents; and constructing an index from the documents using the identifiers in the search result.

42 Claims, 7 Drawing Sheets

OTHER PUBLICATIONS

Wilkinson, R., "Effective Retrieval of Structured Documents," Proceedings of the Seventeenth Annual International ACM–SIGIR Conference on Research and Development in Information Retrieval (SIGIR 94), Springer–Verlag, 1994, pp. 311–317.

Mittendon, E., et al., "Document and Passage Retrieval Based on Hidden Markov Models," Proceedings of the Seventh Annual International ACM–SIGIR Conference on Research and Development in Information Retrival (SIGR 94), Springer–Verlag, 1994, pp. 318–327.

Woods, William A. and Schmolze, James G., "The KL–One Family," Harvard University Center for Research in computing Technology, Aiken Computation Laboratory, Cambridge, MA, Aug. 3, 1990, pp. 1–62.

Woods, Williams A., "Understanding Subsumption and Taxonomy: A Framework for Progress," Harvard University Center for Research in Comparing Technology, Aiken Computation Laboratory, Cambridge, MA, Aug. 15, 1990, pp. 1–61.

Chung, Kin–Man and Yuen, Herbert, "A 'Tiny' Pascal Compiler: the P–Code Interpreter," BYTE Publications, Inc., Sep. 1978.

Chung, Kin–Man and Yuen, Herbert, "A 'Tiny' Pascal Compiler: Part 2: The P–Compiler," BYTE Publication, Inc., Oct. 1978.

Thompson, Ken, "Regular Expression Search Algorithm," Communications of the ACM, vol. II, No. 6, p. 149 et seq., Jun. 1968.

Mitchell, James G., Maybury, William, and Sweet, Richard, Mesa Language Manual, Xerox Corporation.

McDaniel, Gene, "An Analysis of a Mesa Instruction Set," Xerox Corporation, May 1982.

Pier, Kenneth A., "A Retrospective on the Dorado, A High–Performance Personal Computer," Xerox Corporation, Aug. 1983.

Pier, Kenneth A., "A Retrospective on the Dorado, A High–Performance Personal Computer," IEEE Conference Proceedings, The 10th Annual international Symposium on Computer Architecture, 1983.

Eric Brill, "Some Advances in Transformation–Based Part of Speech Tagging," AAAI Conference, 1994.

\* cited by examiner

METHOD AND APPARATUS FOR CASCADED INDEXING AND RETRIEVAL

RELATED APPLICATIONS

This application is a continuation-in-part under 37 C.F.R. § 1.60 of U.S. patent application Ser. No. 08/499,268, for "Method and Apparatus for Generating Query Responses in a Computer-Based Document Retrieval System," filed Jul. 7, 1995, now U.S. Pat. No. 5,724,571 which is incorporated herein by reference.

This application is related to pending patent application Ser. No. 08/797,630, entitled, "Intelligent Network Browser Using Incremental Conceptual Indexer," filed Feb. 7, 1997, which is incorporated herein by reference. This application is also related to pending patent application Ser. No. 08/829,655, entitled, "Method and Apparatus for Distributed Indexing and Retrieval," filed the same day as this application.

BACKGROUND OF THE INVENTION

B. Field of the Invention

The present invention relates to text retrieval systems and, more particularly, to a method for distributing indexes containing conceptual information derived from documents and responding to queries using those indexes. The present invention also relates to responding to queries using existing indexes of conventional document retrieval systems by reindexing documents identified by those systems in accordance conceptual information derived from those documents.

C. Description of the Related Art

The development of efficient and effective text retrieval techniques is critical to managing the increasing amount of textual information available in electronic form. Until recently, information retrieval involved relatively small collections of machine readable text in the range of 100 megabytes of data. Networks bring together collections of information in the gigabyte range, and the increased amount of data makes the retrieval process more difficult.

There are two main concerns facing text retrieval systems: (1) How to identify terms in documents that should be included in the index; and (2) After indexing the terms, how to determine that a document matches a query? Conventional text retrieval techniques rely on indexing keywords in documents. Index terms can be from single words, noun phrases, and subject identifiers derived from syntactic and semantic analysis. Conventional text retrieval systems for the World Wide Web, such as Yahoo!™ from Yahoo! Inc. and AltaVista™ from Digital Equipment Corporation, use these and other types of keyword indexing techniques to index documents available on the web. Unfortunately, a document's keywords alone rarely capture the document's true contents. Consequently, systems relying on keywords in an index to retrieve documents in response to queries often provide unsatisfactory retrieval performance.

Yahoo!, AltaVista, and other convention text retrieval systems for the web employ programs called "web crawlers" to traverse the web. Web crawlers follow links from page to page and extract terms from all the pages that they encounter. Each search engine then makes the resulting information accessible by providing lists of specific pages that match an input search request or query.

Because the web constantly changes as existing pages are modified and new pages are added, web crawlers cannot simply traverse the web and index it once. Instead, to stay current, they must repeatedly traverse the web to identify changes for refreshing the index. Changes are made constantly and without notice, however, so it is not possible to keep up with them.

Moreover, many sites on the web are now reluctant to provide the access demanded by web crawlers to access and index the sites pages because the resources given to the web crawler detract from those for the users. This poses another problem to the ongoing success of such retrieval techniques on the web. "WAIS," which stands for Wide Area Information Servers, suggests one alternative to the use of web crawlers for indexing. WAIS is an architecture for a distributed information retrieval system based on the client server model of computation. WAIS allows users of computers to share information using a common computer-to-computer protocol. WAIS was originally designed and implemented by a development team at Thinking Machines, Inc. led by Brewster Kahle. WAIS requires the sites that publish information on the web to publish an index of that information as well. Search engines can then use the published indexes to respond to queries. Although WAIS helps the resource problem associated with web crawler-based text retrieval systems, it fails to address a more fundamental problem with conventional search and retrieval systems: the quality of the ranked output.

The quality of the output suffers from the way most searches occur. The most common methods for determining whether a document matches a query are the "boolean model" and the "statistical model." According to the boolean model, a match occurs when a document's index terms meet the boolean expression given by the user. The statistical model, on the other hand, is based on the similarity between statistical properties of the document and the query.

It is not unusual for conventional search engines using either approach to return a large number of matches for a simple query. When faced with a list of 20,000 hits in response to a query—not an uncommon experience when searching the web—a user cannot effectively review all the results. Whether the user accesses the matches serially or randomly, the review process takes an unwieldy amount of time to locate the documents of particular interest. Typically, Internet web searchers provide the user with the first 10 hits and continue to provide additional blocks of 10 until the user finds something acceptable or gives up. If the user has a simple information need and the answer shows up in the first 10 or 20 hits, then this is not unreasonable. However, if the user has serious research interest in the results, then it may be important to see the information available in the remaining hits.

Consequently, the criteria by which these hits are ranked becomes very important. More and more systems support some type of ranking feature because users have demanded easy-to-use query languages and ranking to sort out the most important information.

WAIS supports one document ranking scheme. WAIS scores documents based on the number of occurrences of a query term in a document, the location of the terms in a document, the frequency of those terms within the collection, and the size of the document. WAIS, however, uses a least-common-denominator standard that does not allow for sophisticated querying and ranking of results.

Moreover, most retrieval techniques provide ranked results with scoring methodologies that depend on statistics of the indexed collections. This means that the scores assigned to documents in different collections, even when using the same scoring methodology, are not commensurate and can not be used as an adequate basis for combining the ranked results from two separate searches. This poses a problem for distributing the indexing and retrieval processing among multiple processes or platforms.

At the same time, the growing volume of material for indexing has required search engine designers to focus on techniques for efficiency and volume processing, rather then on techniques for guaranteeing the best possible rankings. The conflict between these two objectives, accurate search results and indexing huge collections of information, poses a significant problem for the developers of the next generation of text retrieval systems.

SUMMARY OF THE INVENTION

Accordingly, systems and methods consistent with the present invention substantially obviate one or more of the problems due to limitations, shortcomings, and disadvantages of the related art by distributing the process of indexing documents using the conceptual indexing approach among multiple processes or platforms, applying queries to each index individually, and combining the results using penalty-based scores that include a measure of the difference between terms of the query and the conceptual terms found in the index. A method consistent with the present invention for responding to queries of stored information comprises the steps, performed by a processor, of: receiving a query identifying desired information; providing the query as a search request to a search engine; receiving a search result from the search engine, including identifiers for stored documents; and constructing an index from the documents using the identifiers in the search result.

Both the foregoing general description and the following detailed description are exemplary and explanatory only, and merely provide further explanation of the claimed invention.

BRIEF DESCRIPTION OF THE DRAWINGS

The accompanying drawings, which are incorporated in and constitute a part of this specification, illustrate systems and methods consistent with the invention and, together with the description, explain the advantages and principles of the invention. In the drawings.

DETAILED DESCRIPTION

Figure 1:
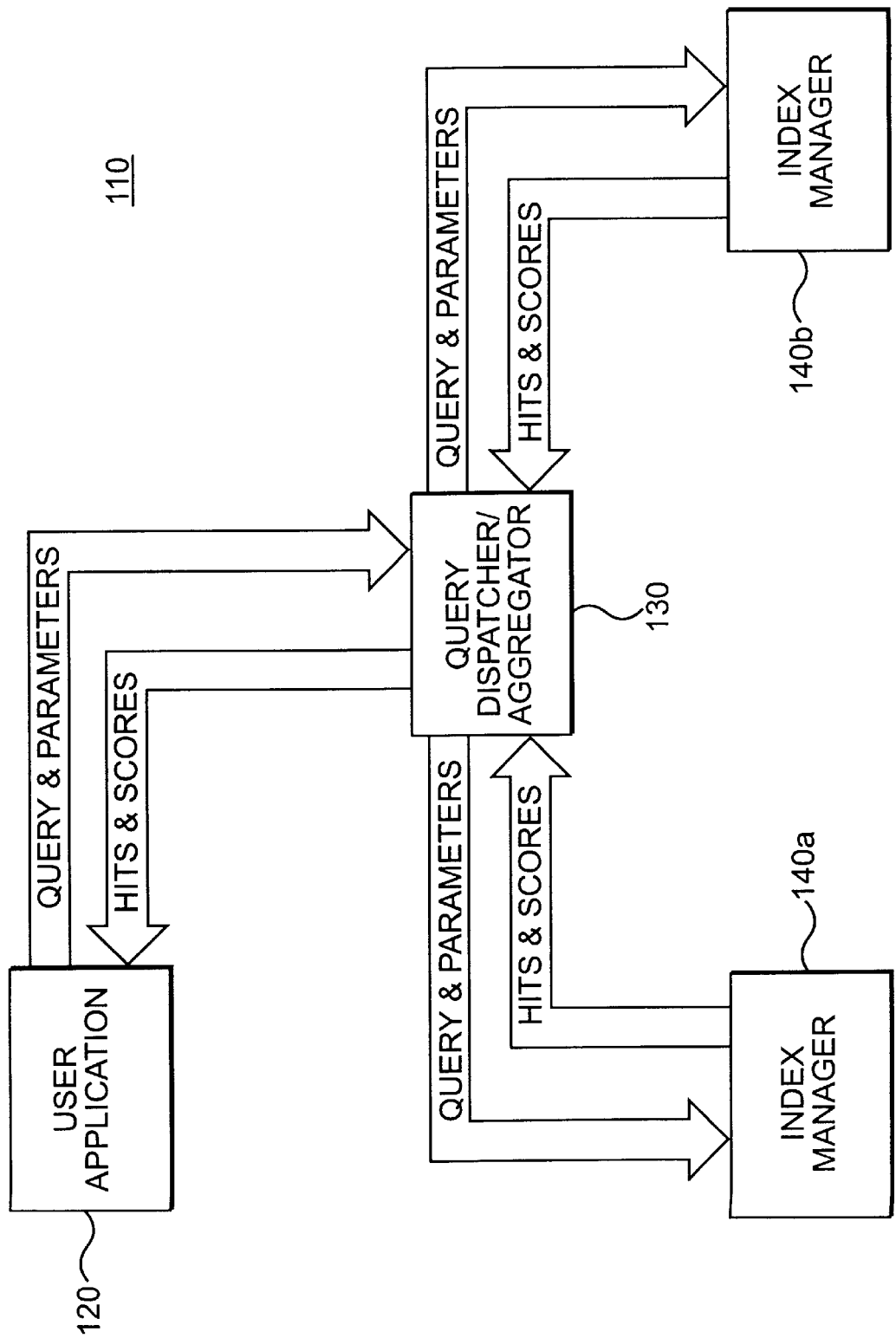
FIG. 1 is a block diagram of a distributed text retrieval system consistent with the present invention.

Reference will now be made in detail to a system and method consistent with the present invention. Wherever possible, the same reference numbers will be used throughout the drawings and the following description to refer to the same or like parts.

Overview

Conceptual indexing refers to extracting conceptual phrases from the source material, assimilating them into a hierarchically-organized, conceptual taxonomy, and indexing those concepts in addition to indexing the individual words of the source text. Dynamic passage retrieval refers to a technique for using the positional information about where words and concepts occur in text to locate specific passages of material within the text that are responsive to a query.

Systems consistent with the present invention assist users in retrieving specific documents from among a large collection of documents, such as web pages, using conceptual indexing and penalty-based, relaxation-ranking retrieval. To distribute the work of constructing and maintaining conceptual indexes, the indexes themselves are distributed among multiple processes or platforms typically located close to where the indexed information resides. The processes may be located on a single machine or on multiple platforms in one or more networks. Thus, the bulk of the maintenance of the indexes is done by the information providers rather than by centralized text retrieval systems. This eliminates the need for sites to provide service for repeated requests by programs such as web crawlers that traverse their pages to see if anything has changed. Rather, the sites perform their own indexing and provide a service to retrieval requests.

In this scheme, the sites employ a "push" model rather than a "pull" model for indexing. Rather than waiting for central indexers to pull that information from the site by repeated polling, the sites know when a page has changed and incrementally update their local index. Central to this architecture is an attribute of the dynamic passage retrieval algorithm that enables result lists from independent searches to be easily combined. Because the penalty scores assigned to passages by the relaxation-ranking algorithm are independent of collection size or statistics, the results of queries to different sites can be collated together and pruned on the basis of their penalty scores, without risk of losing more important information in favor of less important information.

Dynamic passage retrieval makes it possible for the information seeker to access the content of the retrieved documents conceptually to find specific items of information quickly. In this way, dynamic passage retrieval complements document retrieval technology rather than competing with it. This complementary relationship allows one to choose to index a large body of material using conventional techniques, either for legacy or compatibility reasons, or to obtain more compact indexes by, for example, omitting positional information associated with word matches.

Nevertheless, one can obtain the benefits of conceptual indexing and dynamic passage retrieval for the end user by reindexing the results of a traditional search using cascaded indexing. Systems consistent with the present invention assist users in retrieving specific documents from a large collection of documents using cascaded indexing. Cascaded indexing makes a two-stage process consisting of a traditional search using conventional text retrieval systems in high recall mode followed by a conceptual index of the result. This can be done as a way to provide more useful information access to an end user of a conventional retrieval system, or as a way to integrate conventional indexes into distributed indexing and retrieval. When a search of the World-Wide Web produces a results list with 20,000 matches, a conceptual index of the documents corresponding to the resulting hits makes it possible for the user to mine such an abundance of potentially relevant information effectively.

Figure 2:
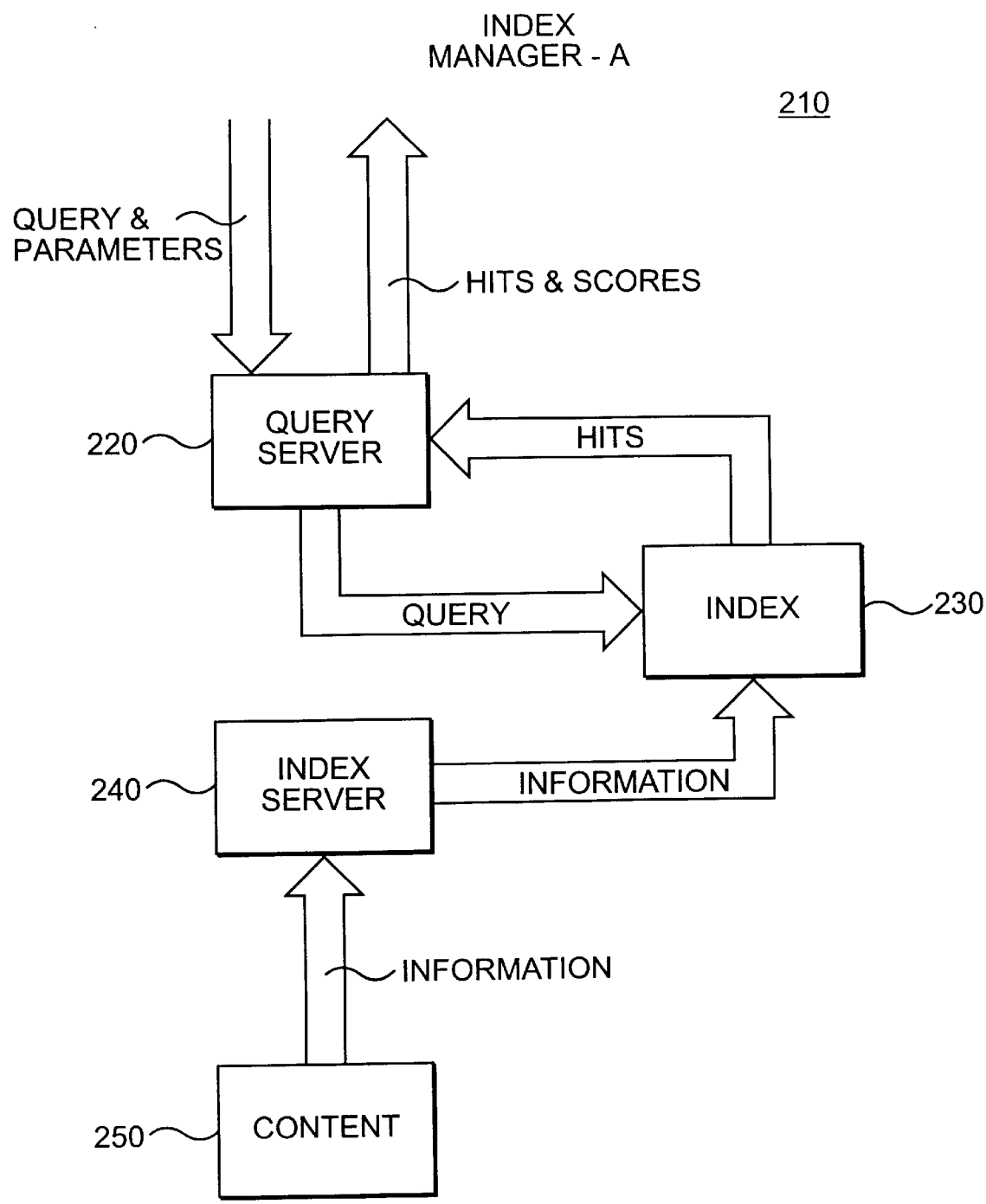
FIG. 2 is a block diagram of one configuration of an index manager of the distributed text retrieval system consistent with the present invention.

Distributed Indexing and Retrieval
   System Configuration
   FIG. 1 illustrates the components of a distributed indexing and retrieval system 110 consistent with the present invention. System 110 includes a user application 120, a query dispatcher/aggregator 130, and multiple index managers 140a and 140b. Although system 110 in FIG. 1 includes two index managers, more than two may be used to take full advantage of the principles of the present invention.
   System 110 resides either in a single platform, such as a personal computer, workstation, or mainframe, or in a network, such as the Internet or an Intranet. System 110 may also be partitioned among multiple processes or platforms. For example, user application 120 may reside on a platform different from the platforms for query dispatcher/aggregator 130 and index manager 140.
   Exemplary platforms for all or part of system 110 include IBM compatible machines with Windows 95® operating system, or conventional workstations, and the Sparcstation® manufactured by Sun Microsystems Corp. and the Solaris® operating system. In the case of a single platform, index managers 140 may be distributed among multiple processes in the platform. On the other hand, the index managers are typically distributed among multiple platforms in the network scenario. Each index manager 140 manages a conceptual index of content information such as web pages. The content may reside on the same platform with the index manager or the content may be located on remote platforms.
   Thus, the content or material to be indexed is generally partitioned into separate domains, each managed by an index manager (140a or 140b). Index manager 140a or 140b is either specially configured to include functionality like that described below with reference to FIGS. 2–4, or configured to include functionality to integrate the system with legacy document retrieval systems like Yahoo! and AltaVista (see FIGS. 4, 6–7). Alternatively, an index manager itself can be configured as a query dispatcher/aggregator, integrating other index managers in a manner similar to way query dispatcher/aggregator 130 integrates index managers 140 in FIG. 1.
   User application 120, for example, a web browser such as Netscape or Internet Explorer, receives user queries, including a term or combination of terms, and a set of parameters, and passes them to dispatcher/aggregator 130. This process uses a protocol for communicating queries and results between user application 120 and query dispatcher/aggregator 130, for example, the TCP/IP protocol used in the Internet. User application 120 receives the query terms from the user and the parameters from predetermined tables that may be modified by user preferences, and sends the query and parameters to query dispatcher/aggregator 130. (In an alternative configuration, the server upon which query dispatcher/aggregator 130 resides, provides user application 120 with a web page to enter the query and search parameters. After the user enters this data, user application 120 sends it to query dispatcher/aggregator 130 using the TCP/IP protocol.)
   The parameters assist in the process of selecting and scoring hits. One typical parameter specifies the maximum number of hits desired (i.e., a hit limit parameter). Alternatively, query dispatcher/aggregator 130 uses a predetermined hit limit. Other parameters set criteria used in identifying hits from the conceptual index and determining penalty scores for the hits in accordance with user preferences. For example, a parameter may govern the value of a penalty score for things like missing terms from the hit.
   Query dispatcher/aggregator 130 passes the query to index managers 140a and 140b, and collects and aggregates the results, including hits and corresponding scores. The hits are either identifiers for documents or passages within the documents, the documents themselves, or the passages within the documents that most closely match the input query. The scores are generated using the penalty-based algorithm that assigns a score based on a measure of the difference between a passage in the document and the query.
   Query dispatcher/aggregator 130 collects the hits from index managers 140a and 140b in accordance with a specified hit limit parameter and returns scored hits together with their penalty scores to user application 120. Query dispatcher/aggregator 130 also uses the penalty scores assigned to the hits by the individual index managers 140a and 140b to collate the results into a merged list in increasing order of penalty, preferably eliminating duplicates if they are encountered. The hits with the highest penalty scores are pruned, if necessary, to reduce the resulting aggregated list to the maximum number of hits requested.
   Asynchronously, and independently from the query processing, index managers 140a and 140b for the different partitions update their indexes according to the policies of their host sites, for example, web servers holding the content from which the index is built. Host site policies are based, for example, on a calender-driven process such as processing the index overnight or on a push model in which the index is updated whenever a site specific application notifies it of a page that needs to be indexed or reindexed. Thus, index managers 140 update the indexes dynamically and in real time, so they remain as current as the publishing host site chooses.
   Index Manager
   FIG. 2 is a block diagram of one configuration of an index manager 210, which can be index managers 140a, 140b. Index manager 210 is specially configured for distributed indexing and retrieval in a manner consistent with the present invention. Specifically, index manager 210 maintains a conceptual index 230 built using the conceptual indexing methodology described below.
   Index manager 210 has two main functions: (1) building or modifying index 230, and (2) responding to queries from dispatcher/aggregator 130. These functions are performed by index server 240 and query server 220, respectively.
   Index server 240 monitors content 250 for changes. Web page content changes as the proprietors of their web servers modify the existing pages, add new pages, or delete pages. Other examples of content include documents managed by an document processing systems, such as word processors and publishing systems, and databases of database management systems. According to the push model, the servers responsible for the content notify index server 240 of changes. Index server 240 then updates index 230 accordingly.
   Query server 220 processes incoming document retrieval requests from query dispatcher/aggregator 130. Each request includes a query with parameters. If query dispatcher/aggregator 130 does not provide a hit limit parameter, query server 220 uses its own predetermined hit limit when processing requests. The predetermined hit limit may simply be the number of the hits, the number of the hits with penalty scores that do not exceed a particular value, or all hits regardless of the penalty scores, provided there is some correspondence between the query and the document or passage (e.g., paragraph or relevant section) within the document.
   Query server 220 accesses conceptual index 230 to identify matches for the query, i.e., hits, and assigns scores to the hits in accordance with the penalty-based scoring algorithm.

Query server 220 then returns the hits and scores to query dispatcher/aggregator 130 in accordance with the hit limit.

Process

Index Server

Figure 3:
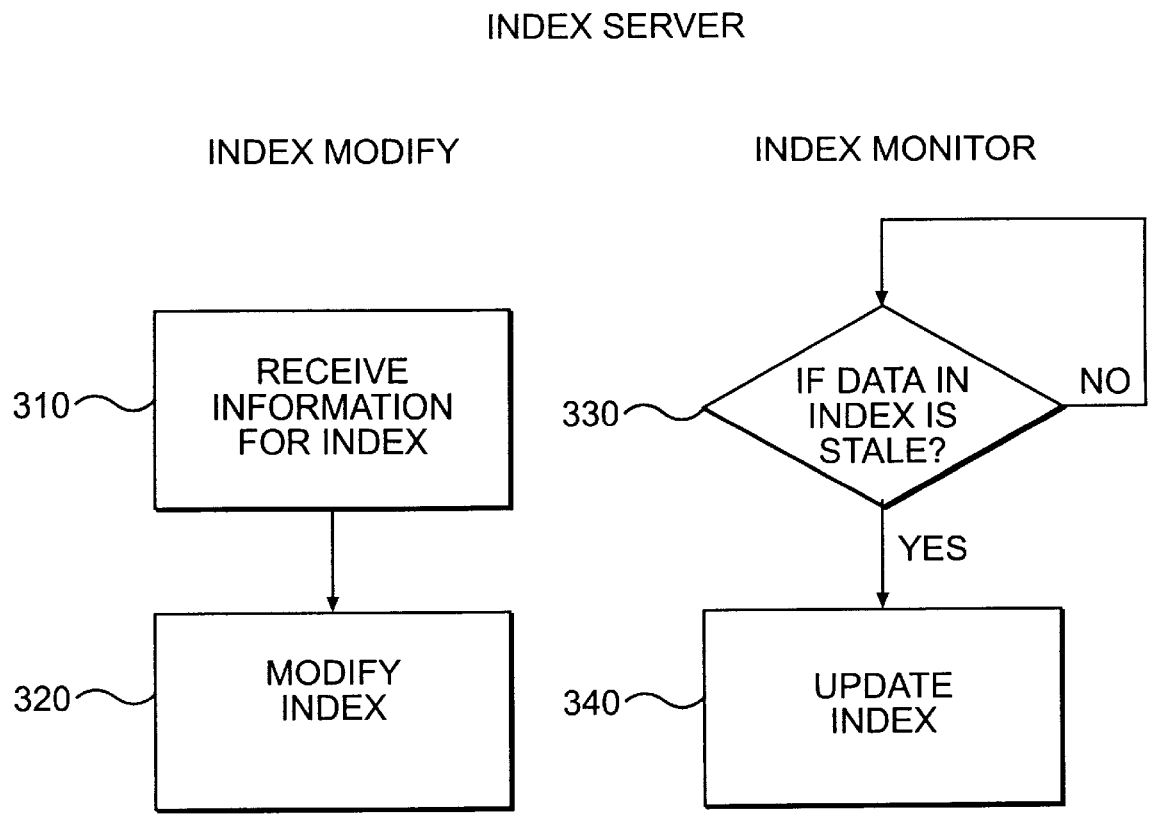
FIG. 3 is a flow chart of the steps performed by an index server for index modify and monitor functions consistent with the present invention.

FIG. 3 includes flow charts of two functions of index server 240 that keep it current, building/modifying and monitoring index 230. The process of building index 230 includes two steps. First, index server 240 receives information from publishers such as web servers on the Internet (step 310). Index server 240 then modifies conceptual index 230 (step 320).

The taxonomic methodology used in conceptual indexing, which provides a solution to the problems of keyword indexing, is discussed in W. Woods and J. Schmolze, "The KL-ONE Family," Harvard University, Aiken Computation Laboratory, Aug. 3, 1990, and W. Woods, "Understanding Subsumption and Taxonomy: A Framework for Progress," Harvard University, Aiken Computation Laboratory, Aug. 15, 1990.

In general, conceptual indexing involves techniques for automatically organizing all of the words and phrases of material into a conceptual taxonomy that explicitly links each concept to its most specific generalizations. The taxonomy is a graph structure that orders concepts by generality using ISA ("is a") links. For example, the following taxonomy represents the relationship between the concepts "computer" and "laptop":

computer

|--laptop.

In this representation, the "computer" concept is a more general form of the "laptop" concept. Thus, the "computer" concept is depicted as a parent of the "laptop" concept in the graph structure. The taxonomy can be used alone to organize information for browsing, or it can be used as an adjunct to search and retrieval techniques to construct improve query results.

Conceptual indexing of text preferably involves four steps: (1) heuristic identification of phrases in the text, (2) mapping these phrases into internal conceptual structures, (3) classifying the structures into a taxonomy, and (4) linking the concept to the location of the phrase in the text. As concepts are assimilated into the conceptual taxonomy during indexing, a broad coverage English lexicon is consulted to determine semantic relationships to other concepts based on recorded knowledge about the meanings of words. If any of the words of an indexed phrase do not yet have conceptual counterparts in the evolving taxonomy, they are assimilated into the taxonomy using information from the lexicon. The taxonomy does not contain all of the information from the lexicon, but only the information for words and concepts extracted from the indexed text or from other phrases assimilated into the taxonomy.

In addition to conceptual information extracted from the content of documents, index 230 also contains identifiers for the documents or passages within the documents corresponding to the indexed conceptual information.

Three types of subsumption relationships in the taxonomy include: (1) asserted subsumption relationships, (2) structural subsumption relationships, and (3) combination of subsumption and structural relationships. The asserted subsumption relationships come from only information in the lexicon. This means that the lexicon provides the foundational relationships for determining the taxonomic relationship between concepts.

Structural relationships are derived from the structure of phrases in the text being indexed. If the lexicon does not have information required to determine where a concept belongs in the taxonomy, the concept is placed in the taxonomy in accordance with structural relationships to other concepts already in the taxonomy. In general, a concept's place in the taxonomy can be based on both structural and subsumption relationships.

The taxonomy can be used as an aid in both formulating and processing queries. In querying the index, terms are treated as concepts and are expanded by their specific children in the taxonomy. Likewise, the taxonomy places limitations on the range of concepts that may correspond to query terms. For additional information and examples of conceptual indexing, see U.S. patent application Ser. No. 08/797,630, entitled, "Intelligent Network Browser Using Incremental Conceptual Indexer," filed Feb. 7, 1997.

Index server 240 also monitors index 230 to determine whether any information in it is stale (step 330). This determination may be based on a notification from the publisher that the information is old. Alternatively, when modifying index information (step 320), index server 240 may assign an indicator, such as a date, to the information in index 230. Index server 240 may then use the indicator to determine whether information in index 230 is stale. When index server 240 identifies stale information in index 230 (step 330), index server 240 updates index 230 accordingly (step 240), for example, by deleting stale information.

Query Server

Figure 4:
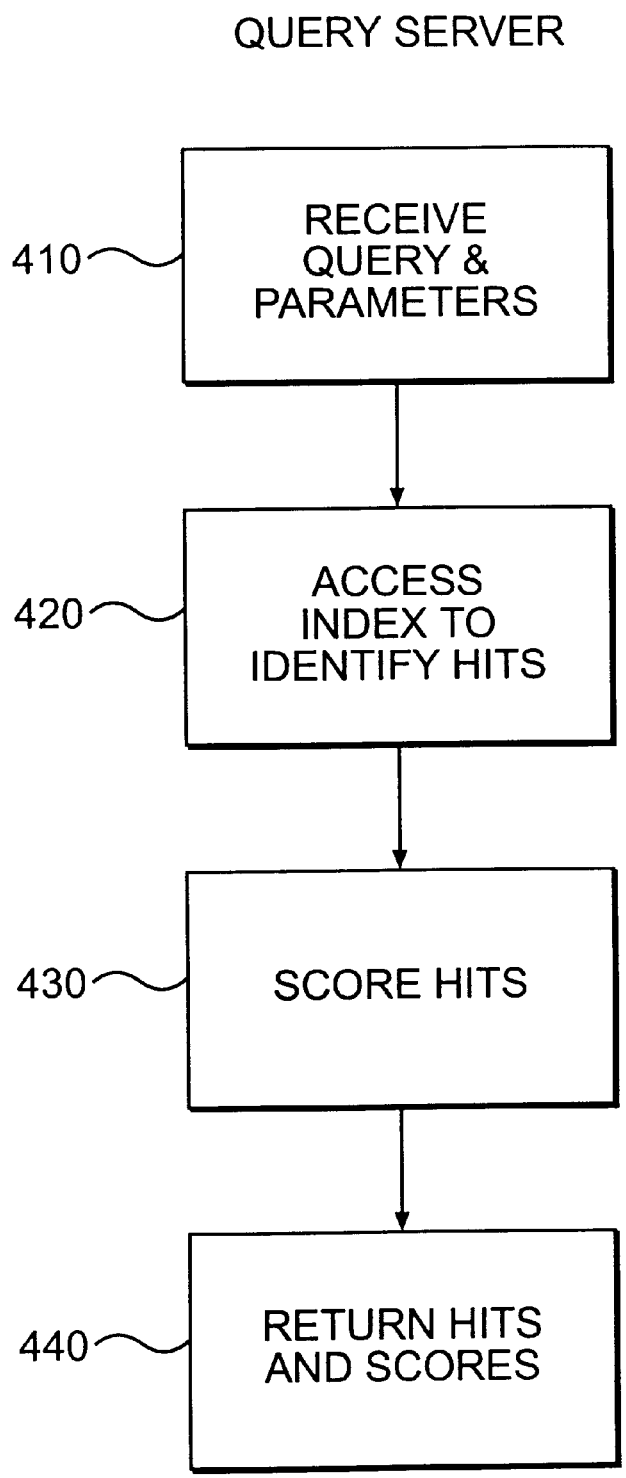
FIG. 4 is a flow chart of the steps performed by a query server consistent with the present invention.

FIG. 4 is a flow chart of the steps performed by query server 220. First, query server 220 receives a query and parameters from query dispatcher/aggregator 130 (step 410). The hit limit parameter may be one set by user application 120 who submitted the query, by query dispatcher/aggregator 130, or by query server 220.

Query server 220 then accesses index 230 to identify documents or passages in documents corresponding to conceptual information in index 230 that most closely correspond to the query (step 420). Query server 220 scores these hits using a scoring algorithm that scores passages by measuring how much they depart (in any of several dimensions) from an ideal passage, i.e., an exact replica of the query (step 430). The measure is referred to as relaxation ranking. In contrast with traditional retrieval ranking methods, where scores of results are based on accruing weights corresponding to pieces of evidence that a given result is relevant to a query, the scores assigned by the relaxation-ranking algorithm are based on accruing penalties for various kinds of departure from the ideal. Thus, the best passage is the one with the lowest score, as opposed to the highest score used by customary approaches. This approach is referred to as penalty-based scoring.

In addition to providing high-quality rankings, penalty-based scores have the additional attractive property that the values of the scores themselves are meaningful and interpretable. Thus, a user looking at a score can determine whether a match is likely to be good or not and can estimate how good it is likely to be. For example, zero (0) is a perfect score and many retrieved results will achieve this score. In contrast, scores assigned by traditional methods are only relatively comparable, and then only when derived from the same collection. Even in the case of probabilistic retrieval, where the scores are estimates of probabilities of relevance, and therefore should be somewhat interpretable, the individual probability scores are relative to the statistics of the collection and not individually meaningful. The probability of one (1) is virtually never reached, and there is no a priori probability that corresponds to a definitely relevant match. The aforementioned patent application, Ser. No. 08/499,268, for "Method and Apparatus for Generating Query Responses in a Computer-Based Document Retrieval System," describes penalty-based scoring in greater detail.

Because the penalty-based scores are individually meaningful according to criteria that do not depend on the material being indexed, two different result lists from different collections can be collated together on the basis of their penalty scores without the problems faced by other scoring methods used in information retrieval. This makes it possible to subdivide material to be indexed and distribute the work of indexing and search, since the results can easily be combined.

Returning to FIG. 4, query server 220 returns the hits and corresponding scores to query dispatcher/aggregator 130 (step 440).

Query Dispatcher/Aggregator

Figure 5:
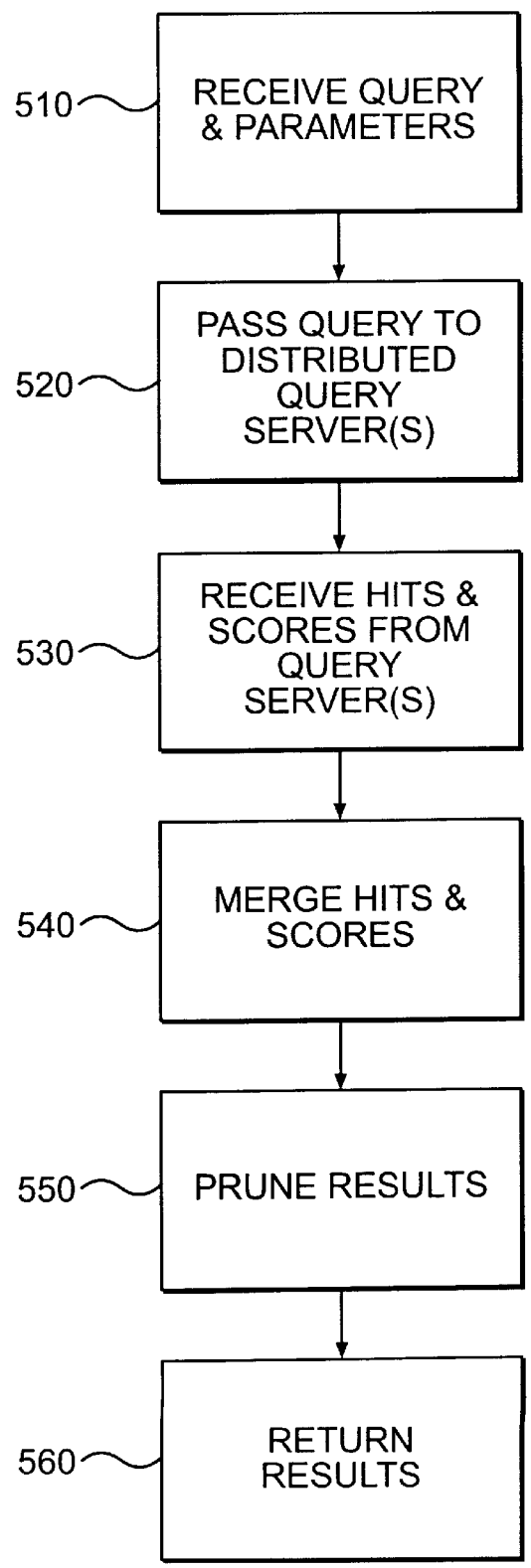
FIG. 5 is a flow chart of the steps performed by a query dispatcher/aggregator of the distributed text retrieval system consistent with the present invention.

FIG. 5 is a flow chart of the steps performed by query dispatcher/aggregator 130. First, query dispatcher/aggregator 130 receives a query and parameters from, for example, user application 120 (step 510). Query dispatcher/aggregator 130 then passes the query to each of the distributed index managers 140 and, particularly, the query server 230 of each index manager 140 (step 520). After each query server 230 processes the query using the associated conceptual index 230, query dispatcher/aggregator 130 receives the hits and scores (step 530). Query dispatcher/aggregator 130 then merges the hits and scores from the various index managers 140 (step 540) and prunes the results to, for example, eliminate duplicates or hits with scores above a threshold value (step 550). Finally, query dispatcher/aggregator 130 returns the results, including the hits and scores to user application 120 (step 560).

Cascaded Indexing and Retrieval

Cascaded indexing and retrieval involves the dynamic construction of a conceptual index of information identified by the results of a conventional text retrieval system such as Yahoo! and AltaVista. In order to provide for material that is already indexed by some other methodology that does not provide commensurate penalty-based scores, for example, the methodology used by AltaVista a reindexer takes the results of the conventional search and reindexes the documents, such as web pages, using the relaxation ranking method of the dynamic passage retrieval algorithm. The reindexer then provides the results of this reindexing process to the query dispatcher/aggregator. The reindexer interacts with the conventional index server of AltaVista, passing the query to that server. The reindexer then indexes the contents of the documents identified by the server in response to the query.

Figure 6:
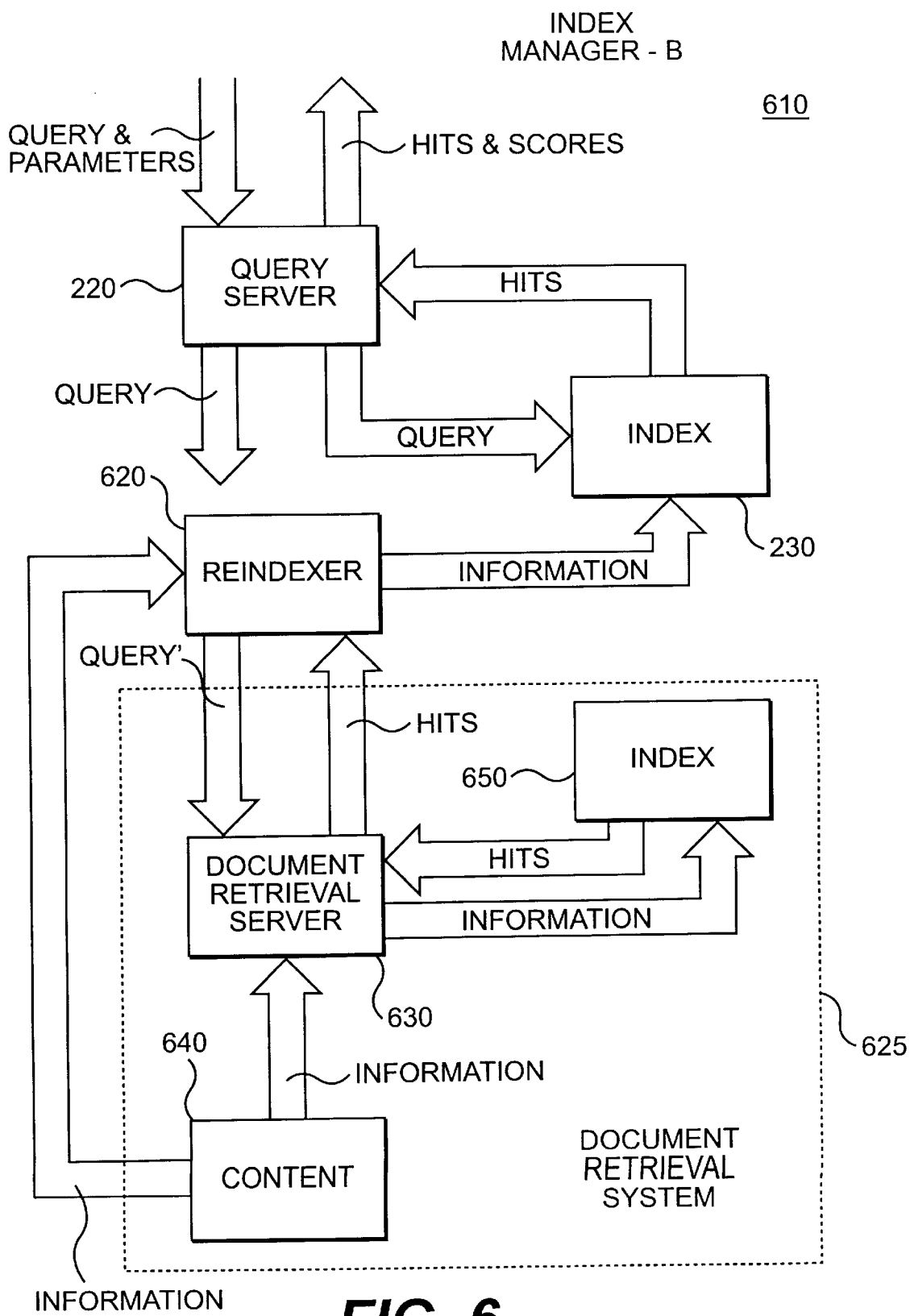
FIG. 6 is a block diagram of another configuration of the index manager of the distributed text retrieval system consistent with the present invention.

FIG. 6 illustrates the components of an index manager 610 consistent with the present invention for implementing cascaded indexing and retrieval. Index manager 610 consists of query server 220, index 230, and a reindexer 620. Index manager 610 is designed to complement a conventional document retrieval system 625, which consists of a document retrieval server 630 and an index 650 of content 640, such as web pages. In the Internet, users send queries to document retrieval system 625 using the TCP/IP protocol, and system 625 in turn accesses index 650 to identify specific web pages that satisfy the terms of each query according to predetermined criteria set by system 625.

To implement cascaded indexing in a manner consistent with the present invention, query server 220 provides the user's query to reindexer 620. Reindexer 620 formats the query for system 630 and transmits the reformatted query to server 630. Server 630 provides the query results to reindexer 620, which accesses the content identified in the hits and reindexes the content into conceptual index 230. Query server 220 then processes the query on index 230 in the manner discussed above, and returns the hits and scores to user application 120.

Process

Cascaded indexing uses the query server processing discussed above with reference to FIG. 4, with the additional step of providing the query to reindexer 620 before accessing index 230 to process the input query.

Reindexer

Figure 7:
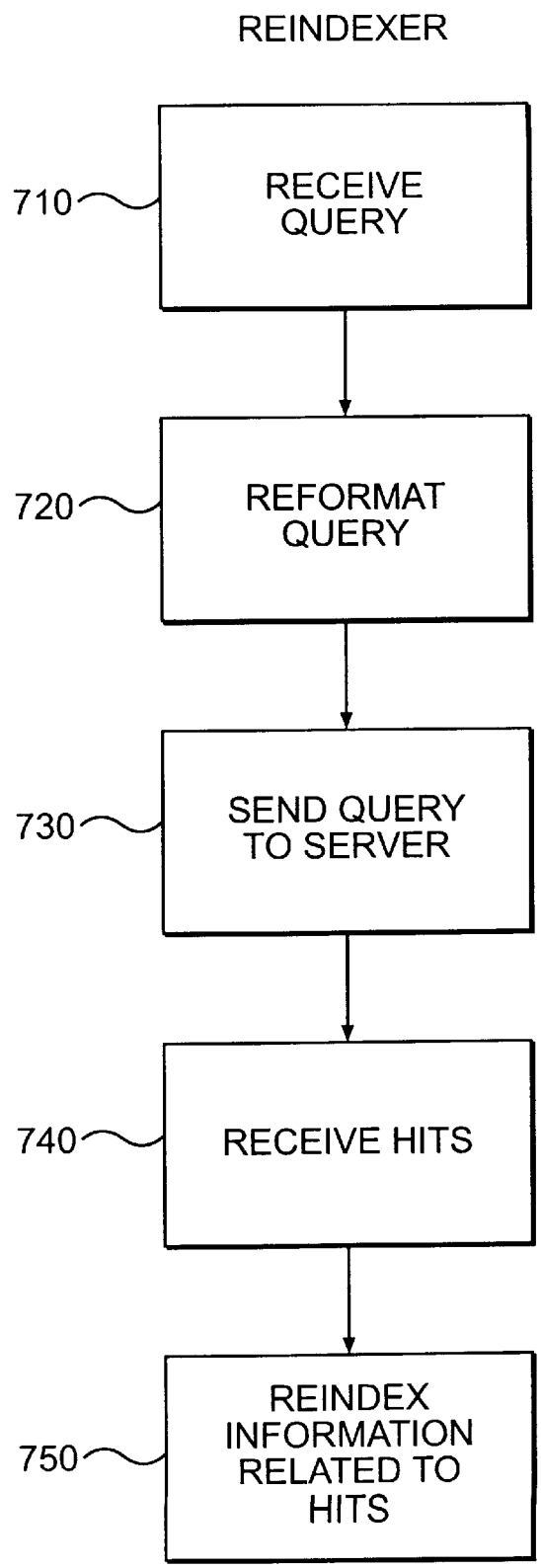
FIG. 7 is a flow chart of the steps of a reindexer of the index manager of FIG. 6.

FIG. 7 is a flow chart of the steps performed by reindexer 620. First, reindexer 620 receives the query from query server 220 (step 710), reformats the query for document retrieval system 625 (step 720), and then sends the reformatted query to server 630 (step 730). After reindexer 620 sends the query, it receives the hits of document retrieval system 625 (step 740). Reindexer 620 reindexes the documents related to the hits identified by system 625 into index 230 (step 750).

Conclusion

To overcome the shortcomings of conventional text retrieval systems, systems consistent with the present invention can retrieve specific documents from a large collection of documents using conceptual indexing and penalty-based, relaxation-ranking retrieval. This combination enables the system to distribute the conceptual index among a plurality of process or platforms. Conceptual indexing and penalty-based, relaxation-ranking also enhances text retrieval of conventional systems through cascaded indexing.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The scope of the invention is defined by the claims and their equivalents.

What is claimed is:

1. A method for responding to queries of stored information comprising the steps, performed by a processor, of:
    receiving a query identifying desired information;
    providing the query as a search request to a search engine;
    receiving a search result from the search engine, including identifiers for stored documents; and
    constructing an index from the documents using the identifiers in the search result.

2. The method of claim 1, wherein the constructing step includes the substeps of:
    extracting conceptual information from the documents;
    analyzing the extracted conceptual information semantically; and
    assembling the index from the extracted conceptual information in a manner that reflects relations based on semantic data in a stored lexicon.

3. The method of claim 1, wherein the constructing step includes the substep of:
    accessing the identified documents.

4. An apparatus for responding to queries of stored information, comprising:
    first receiving means configured to receive a query identifying desired information;
    providing means configured to provide the query as a search request to a search engine;
    second receiving means configured to receive a search result from the search engine, including identifiers for stored documents; and constructing means configured to construct an index from the documents using the identifiers in the search result.

5. The apparatus of claim 4, wherein the constructing means includes:
   extracting means configured to extract conceptual information from the documents;
   analyzing means configured to analyze the extracted conceptual information semantically; and
   assembling means configured to assemble the index from the extracted conceptual information in a manner that reflects relations based on semantic data in a stored lexicon.

6. The apparatus of claim 4, wherein the constructing means includes:
   accessing means configured to access the identified documents.

7. A computer program product comprising:
   a computer usable medium having computer readable code embodied therein for responding to queries of stored information, the computer usable medium comprising:
   a first receiving module configured to receive a query identifying desired information;
   a providing module configured to provide the query as a search request to a search engine;
   a second receiving module configured to receive a search result from the search engine, including identifiers for stored documents; and
   a constructing module configured to construct an index from the documents using the identifiers in the search result.

8. The computer usable medium of claim 7, wherein the constructing module includes:
   an extracting module configured to extract conceptual information from the documents;
   an analyzing module configured to analyze the extracted conceptual information semantically; and
   an assembling module configured to assemble the index from the extracted conceptual information in a manner that reflects relations based on semantic data in a stored lexicon.

9. The computer usable medium of claim 7, wherein the constructing module includes:
   an accessing module configured to access the identified documents.

10. A method for responding to queries comprising the steps, performed by a processor, of:
    receiving a query identifying desired information;
    providing the query as a search request to a search engine;
    receiving a search result from the search engine, including identifiers to documents distributed among a plurality of platforms; and
    constructing an index from the documents using the identifiers in the search result.

11. An apparatus for responding to queries of stored information, comprising:
    first receiving means configured to receive a query identifying desired information;
    providing means configured to provide the query as a search request to a search engine;
    second receiving means configured to receive a search result from the search engine, including identifiers to documents distributed among a plurality of platforms; and
    constructing means configured to construct an index from the documents using the identifiers in the search result.

12. A computer program product comprising:
    a computer usable medium having computer readable code embodied therein for responding to queries of stored information, the computer usable medium comprising:
    a receiving module configured to receive a query identifying desired information;
    a providing module configured to provide the query as a search request to a search engine;
    a receiving module configured to receive a search result from the search engine, including identifiers to documents distributed among a plurality of platforms; and
    a constructing module configured to construct an index from the documents using the identifiers in the search result.

13. A method for accessing stored information comprising the steps, performed by a processor, of:
    receiving a query identifying desired information;
    providing the query as a search request to a search engine;
    receiving a search result from the search engine, including identifiers for stored documents;
    constructing an index from the documents accessed using the search result;
    identifying hits representing information in the index corresponding to the query;
    determining, for each hit, a measure of a difference between the query and the information from one of a plurality of stored indexes corresponding to the hit; and
    combining the hits from the stored indexes in accordance with the corresponding measure.

14. An apparatus for accessing stored information, comprising:
    first receiving means configured to a query identifying desired information;
    providing means configured to provide the query as a search request to a search engine;
    second receiving means configured to receive a search result from the search engine, including identifiers for stored documents;
    constructing means configured to construct an index from the documents accessed using the search result;
    identifying means configured to identify hits representing information in the index corresponding to the query;
    determining means configured to determine, for each hit, a measure of a difference between the query and the information from one of a plurality of stored indexes corresponding to the hit; and
    combining means configured to combine the hits from stored the indexes in accordance with the corresponding measure.

15. A computer program product comprising:
    a computer usable medium having computer readable code embodied therein for accessing stored information, the computer usable medium comprising:
    a receiving module configured to a query identifying desired information;
    a providing module configured to provide the query as a search request to a search engine;
    a receiving module configured to receive a search result from the search engine, including identifiers for stored documents;

a constructing module configured to construct an index from the documents accessed using the search result;

an identifying module configured to identify hits representing information in the index corresponding to the query;

a determining module configured to determine, for each hit, a measure of a difference between the query and the information from one of a plurality of stored indexes corresponding to the hit; and a combining module configured to combine the hits from stored the indexes in accordance with the corresponding measure.

16. A method for accessing information comprising the steps, performed by a processor, of:

receiving a query identifying desired information;

providing the query as a search request to a search engine;

receiving a search result from the search engine, including identifiers for stored documents;

constructing an index of conceptual information from the documents using the identifiers in the search result;

identifying conceptual information from the index that corresponds to the query; and determining a measure of a difference between the query and the identified information.

17. The method of claim 16, wherein the constructing step includes the substep of:

extracting conceptual information from the identified documents; and assembling the index from the extracted conceptual information, reflecting relations based on semantic data in a stored lexicon.

18. The method of claim 17, wherein the searched documents are linked to other documents in a parent-child relationship, wherein extracting step includes the substep of:

accessing child-documents linked to the identified documents; and wherein the assembling step includes the substep of:

including in the index conceptual information extracted from the child-documents.

19. The method of claim 16, further comprising step of:

retrieving a portion of one of the documents identified in the index as including conceptual information corresponding to the query.

20. The method of claim 19, wherein the retrieving step further includes the substep of:

receiving a request to retrieve the portion of the document identified in the index as including conceptual information corresponding to the query.

21. The method of claim 20, wherein the receiving step further includes the substep of presenting an identifier for the portion of the document identified in the index as including conceptual information corresponding to the query.

22. An apparatus for accessing stored information, comprising:

first receiving means configured to receive a query identifying desired information;

providing means configured to provide the query as a search request to a search engine;

second receiving means configured to receive a search result from the search engine, including identifiers for stored documents;

constructing means configured to construct an index of conceptual information from the documents using the identifiers in the search result;

identifying means configured to identify conceptual information from the index that corresponds to the query; and determining means configured to identify a measure of a difference between the query and the identified information.

23. The apparatus of claim 22, wherein the constructing means includes:

extracting means configured to extract conceptual information from the identified documents; and assembling means configured to assemble the index from the extracted conceptual information, reflecting relations based on semantic data in a stored lexicon.

24. The apparatus of claim 23, wherein the searched documents are linked to other documents in a parent-child relationship, wherein the extracting means includes:

accessing means configured to access child-documents linked to the identified documents; and wherein the assembling means includes:

including means configured to include in the index conceptual information extracted from the child-documents.

25. The apparatus of claim 22, further comprising:

retrieving means configured to retrieve a portion of one of the documents identified in the index as including conceptual information corresponding to the query.

26. The apparatus of claim 25, wherein the retrieving means further includes:

receiving means configured to receive a request to retrieve the portion of the document identified in the index as including conceptual information corresponding to the query.

27. The apparatus of claim 26, wherein the receiving means configured to receive a request to retrieve the portion of the document identified in the index as including conceptual information corresponding to the query, includes:

presenting means configured to present an identifier for the portion of the document identified in the index as including conceptual information corresponding to the query.

28. A computer program product comprising:

a computer usable medium having computer readable code embodied therein for accessing stored information, the computer usable medium comprising:

a receiving module configured to receive a query identifying desired information;

a providing module configured to provide the query as a search request to a search engine;

a receiving module configured to receive a search result from the search engine, including identifiers for stored documents;

a constructing module configured to construct an index of conceptual information from the documents using the identifiers in the search result;

an identifying module configured to identify conceptual information from the index that corresponds to the query; and a determining module configured to identify a measure of a difference between the query and the identified information.

29. The computer usable medium of claim 28, wherein the constructing module includes:

an extracting module configured to extract conceptual information from the identified documents; and an assembling module configured to assemble the index from the extracted conceptual information, reflecting relations based on semantic data in a stored lexicon.

30. The computer usable medium of claim 29, wherein the searched documents are linked to other documents in a parent-child relationship, wherein the extracting module includes:

an accessing module configured to access child-documents linked to the identified documents; and wherein the assembling module includes:

an including module configured to include in the index conceptual information extracted from the child-documents.

31. The computer usable medium of claim 28, further comprising:

a retrieving module configured to retrieve a portion of one of the documents identified in the index as including conceptual information corresponding to the query.

32. The computer usable medium of claim 31, where in the retrieving module further includes:

a receiving module configured to receive a request to retrieve the portion of the document identified in the index as including conceptual information corresponding to the query.

33. The computer usable medium of claim 32, wherein the receiving module configured to receive a request to retrieve the portion of the document identified in the index as including conceptual information corresponding to the query, includes:

a presenting module configured to present an identifier for the portion of the document identified in the index as including conceptual information corresponding to the query.

34. A method for responding to queries of stored information comprising the steps, performed by a processor, of:

receiving a query identifying desired information;

providing the query as a search request to a search engine;

receiving a search result from the search engine identifying stored documents;

retrieving the stored documents based on the search result;

constructing an index from the retrieved documents; and permitting searches of the retrieved documents in accordance with the index.

35. The method of claim 34, wherein the constructing step includes the substeps of:

extracting conceptual information from the documents;

analyzing the extracted conceptual information semantically; and assembling the index from the extracted conceptual information in a manner that reflects relations based on semantic data in a stored lexicon.

36. The method of claim 34, wherein the step of constructing an index from the retrieved documents, includes indexing the retrieved documents in accordance with a first search algorithm, and wherein the step of permitting searches of the retrieved documents in accordance with the index, includes using a second search algorithm that is different from the first search algorithm.

37. The method of claim 34, wherein the step of constructing an index from the retrieved documents, includes indexing the retrieved documents using an algorithm that includes a factor proportional to the distance between occurrences of terms in each document.

38. The method of claim 34, wherein the step of constructing an index from the retrieved documents, includes indexing the retrieved documents to support passage retrieval in each retrieved document.

39. A query processing apparatus, comprising:

at least one memory having program instructions to receive a query identifying desired information, provide the query as a search request to a search engine, receive a search result from the search engine identifying stored documents, retrieve the stored documents based on the search result, construct an index from the retrieved documents, and permit searches of the retrieved documents in accordance with the index; and a processor for executing the instructions.

40. A query processing apparatus according to claim 39, wherein the program instructions to construct an index from the retrieved documents include instructions to extract conceptual information from the documents, analyze the extracted conceptual information semantically, and assemble the index from the extracted conceptual information in a manner that reflects relations based on semantic data in a stored lexicon.

41. A computer readable medium containing instructions for controlling a data processing system to perform a query processing method, the method comprising:

receiving a query identifying desired information;

providing the query as a search request to a search engine;

receiving a search result from the search engine identifying stored documents;

retrieving the stored documents based on the search result;

constructing an index from the retrieved documents; and permitting searches of the retrieved documents in accordance with the index.

42. The computer readable medium of claim 41, wherein the constructing operation includes:

extracting conceptual information from the documents;

analyzing the extracted conceptual information semantically; and assembling the index from the extracted conceptual information in a manner that reflects relations based on semantic data in a stored lexicon.

* * * * *

UNITED STATES PATENT AND TRADEMARK OFFICE
CERTIFICATE OF CORRECTION

PATENT NO. : 6,182,063 B1
DATED : January 30, 2001
INVENTOR(S) : William A. Woods Page 1 of 1

It is certified that error appears in the above-identified patent and that said Letters Patent is hereby corrected as shown below:

<u>Claim 14, column 12,</u>
Line 54, delete "stored the" and insert -- the stored --.

Signed and Sealed this

Twenty-fifth Day of September, 2001

Attest:

NICHOLAS P. GODICI
Acting Director of the United States Patent and Trademark Office Attesting Officer